June 23, 1942. H. P. PHILLIPS 2,287,707
PISTON RING ASSEMBLY
Filed July 24, 1939
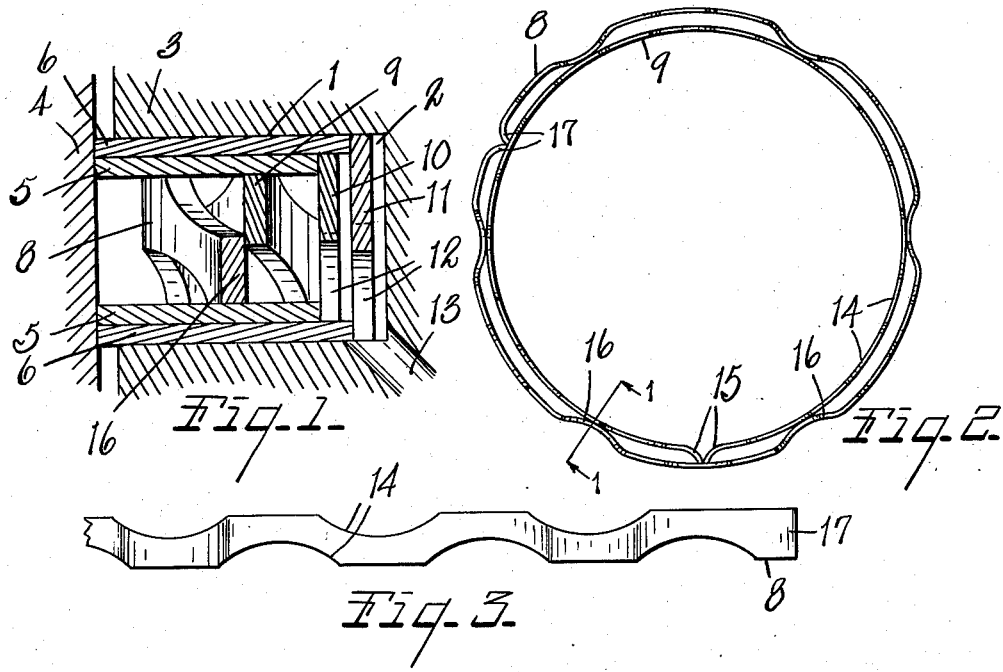
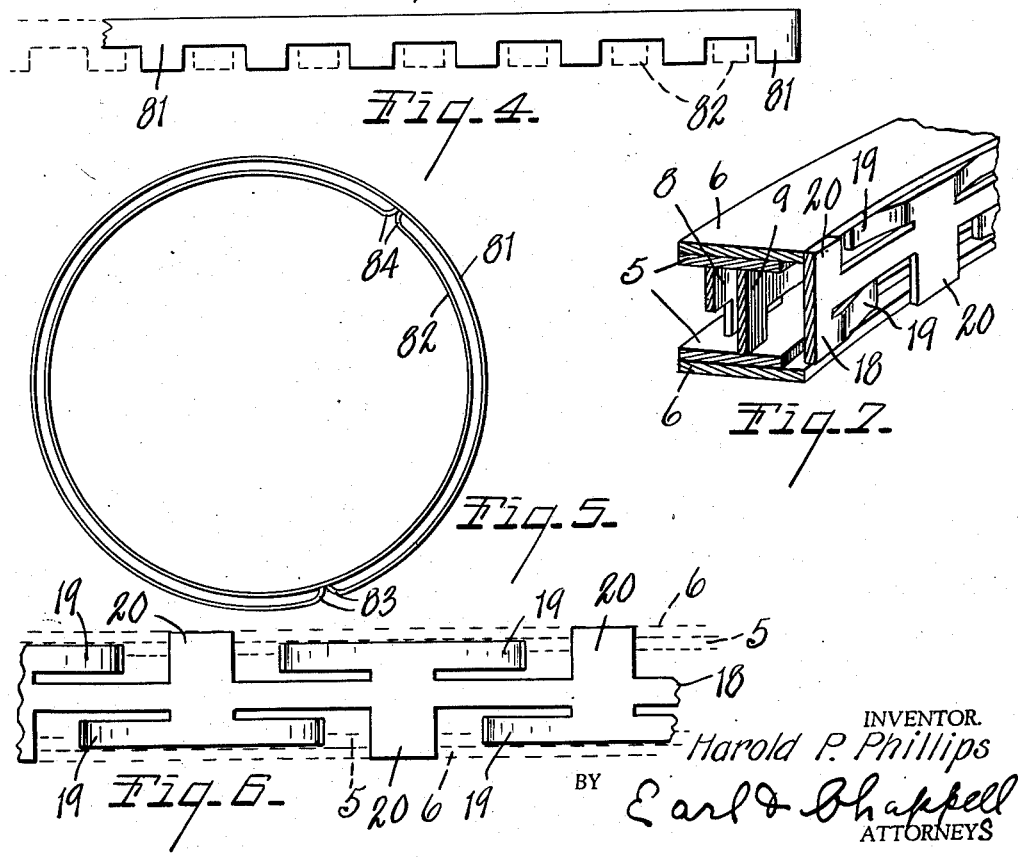
INVENTOR.
Harold P. Phillips
BY Earl & Chappell
ATTORNEYS Patented June 23, 1942

2,287,707

UNITED STATES PATENT OFFICE 2,287,707

PISTON RING ASSEMBLY

Harold P. Phillips, Hastings, Mich., assignor to Hastings Manufacturing Company, Hastings, Mich.

Application July 24, 1939, Serial No. 286,055

12 Claims. (Cl. 309—45)

This invention relates to improvements in piston ring assemblies.

The main objects of my invention are:

First, to provide a novel piston ring assembly which is highly efficient as an oil ring and is well adapted for use in worn cylinders.

Second, to provide an assembly of the type described including a plurality of thin steel, ribbon-like cylinder wall engaging elements, and novel means for spacing certain of the elements in the piston ring groove.

Third, to provide an assembly of the type described in the form of a composite ring including a plurality of thin cylinder wall engaging elements or segments and an intermediate spacer therefor, comprising a pair of generally concentric annular ribbon-like members.

Fourth, to provide an assembly of the type described including a plurality of thin steel cylinder wall engaging elements with improved individual expanding means therefor to secure independent radial action thereof.

Fifth, to provide a piston ring assembly including a plurality of cylinder wall engaging elements and a novel axial spacer therefor.

Sixth, to provide a novel spacer for a pair of cylinder wall engaging elements in a piston ring assembly.

Further objects relating to details and economies of my invention will definitely appear from the description to follow. The invention is defined in the claims.

A structure embodying the features of my invention is illustrated in the accompanying drawing, wherein:

Fig. 1 is a fragmentary view in vertical section on a line corresponding to line I—I of Fig. 2, illustrating one embodiment of the assembly of my invention in operative relation to a piston and cylinder wall, the parts being enlarged and no attempt having been made to give an accurate representation of the exact dimensions and relative proportions thereof.

Fig. 2 is an end view of the novel spacer or intermediate member of my invention as embodied in Fig. 1.

Fig. 3 is an enlarged fragmentary view in side elevation further illustrating the shape or formation of one of the elements of the spacer described above.

Fig. 4 is an enlarged fragmentary view in side elevation illustrating a modified form of spacer element suitable for use in the manner illustrated in Fig. 1, the relative spacing of a further similar element coacting with this element being illustrated in dotted lines.

Fig. 5 is a plan view illustrating a modified spacer in accordance with the invention, this construction embodying certain of the features of the embodiment illustrated in Fig. 4.

Fig. 6 is an enlarged fragmentary view in side elevation illustrating a form of expander element suitable for imparting individual independent expanding action to the cylinder wall engaging elements in accordance with my invention.

Fig. 7 is a fragmentary perspective view illustrating an assembly of elements according to my invention including the individual expanding means illustrated in Fig. 6.

The present invention relates to a composite piston ring assembly of the type illustrated and described in my Patent No. 2,148,997, dated February 28, 1939, including a plurality of spaced thin steel ribbon-like cylinder wall engaging elements maintained in axialy spaced relation by an intermediate spacer and thrust radially into engagement with the cylinder wall by an expander spring. The present improvements relate in particular to an assembly comprising a plurality of thin cylinder wall engaging ring members at each side of an intermediate spacer member with expander means acting individually on the ring members. It further relates to a spacing element well adapted for such an assembly, although manifestly it is capable of employment including only a single cylinder wall contacting element on either side of the spacer or in other adaptations including various combinations and arrangements of the cylinder wall engaging elements. The invention likewise includes novel and improved expanding means for the aforesaid cylinder wall engaging elements whereby an individual and independent radial action is imparted to each thereof so that they adapt themselves to irregularities in the cylinder wall, with resultant very effective scraping and sealing action thereon.

Inasmuch as the present assembly is primarily intended for use as an oil ring, I illustrate the various constituents thereof as provided with appropriate ventilating provisions to facilitate the flow of oil scraped from the cylinder wall through the assembly to the oil drainage openings in the piston. However, it will be perfectly clear to those skilled in the art that the provisions of my invention are well adapted for embodiment in a compression ring as well and therefore I do not wish to be unduly limited in this respect.

Referring to Fig. 1, the reference numeral I in general designates the improved piston ring assembly of my invention which is shown mounted in a groove 2 in a piston 3 slidable in the cylinder 4.

The assembly in its preferred embodiment includes pairs of annular thin cylinder wall engaging elements 5, 5, 6, 6 respectively, an element of each pair being disposed on either axial side of an intermediate spacer assembly which is in accordance with the invention made up of a pair of annular inner and outer ribbon-like members 8, 9 disposed in concentric relation. The pairs of elements 5, 5, 6, 6 are respectively urged radially by the expanding springs 10, 11, the former having a smaller axial dimension or width than the latter. The elements 6 constitute the extreme upper and lower elements of the assembly and are of greater radial thickness than the other pair of elements 5 so as to provide a space at the rear of the latter receiving the outermost expanding spring 10 in radial thrust engagement with elements 5 in the manner illustrated in Fig. 1 while the innermost expanding spring 11 bears radially against the inner edges of the elements or segments 6. In this manner, an independent expansive action is exerted on the side elements or segments so that an effective engagement with the cylinder wall 4 is had at all times regardless of irregularities therein. As illustrated in Fig. 1, the expanding springs have oil drainage openings or scallops 12 therein for communicating the interior of the assembly with the oil drainage ports 13 in the piston. These elements 5 and 6 are suitably formed of ribbon steel or other wear resisting material.

The expanding springs 10, 11 may be of any appropriate design but are preferably of a generally polygonal outline with the corners thereof crimped or rounded and connected by straight sides, the rounded corners of the springs engaging the wall engaging elements 5, 6. Such a construction is well known in the art, hence I have not illustrated the same in detail.

The construction and arrangement of the spacer members 8, 9 are illustrated in detail in Figs. 2 and 3. These members are preferably formed of ribbon stock. The members 8 and 9 are of equal axial dimension or width so as to maintain the side elements 5, 5, 6, 6 in parallel spacing without twisting or wobbling when in use and are provided with peripherally spaced oil drainage recesses or scallops 14 staggered on the upper and lower sides thereof, as illustrated in Fig. 3. These elements are of the split type and in the preferred embodiment the innermost element 9 has a circular outline terminating in a pair of out-turned lips 15 which engage with one another to prevent further circumferential compression of the member. The outermost spacer element 8 is also of generally circular outline, but is provided with circumferentially spaced concavities or crimps 16 and the inturned extremities 17 thereof engage one another as in the case of out-turned lips 15 of the inner element 9 to prevent further circumferential compression of the spacer assembly, also to aid in radially spacing the two elements 8, 9. The oil drainage recesses or scallops 14 of the inner and outer spacer elements 8, 9 are preferably overlapped slightly circumferentially relative to one another in the manner illustrated in Figs. 1 and 2 but not to such an extent as to cause a complete cutting off of the radial opening through the spacer assembly such as might tend to obstruct the free flow of oil therethrough.

If necessary and desired, appropriate means may be provided to positively lock the aforesaid inner and outer spacer elements 8 against inadvertent relative angular movement which might result in their overlapping and interfering with the free flow of oil through the assembly.

Although I have illustrated one means of concentrically spacing the elements 8, 9 of the spacer assembly by crimping the exterior element and engaging the respective extremities of one element with the other element, it will be apparent that other means for securing the proper concentric arrangement can be readily arrived at. It is not absolutely necessary that one of the elements be crimped as in Fig. 2, and in Figs. 4, 5 I have illustrated an embodiment of my invention, wherein both the outer element 81 and the inner element 82 are circular in shape, being concentrically spaced merely by the respective inturned and out-turned extremities 83, 84 thereof. Furthermore, the ventilation of the spacer assembly may take the form illustrated in Fig. 4, i. e., it may consist of rectangular notches in the element along either one or both sides thereof. In Fig. 4, I illustrate the preferred overlapped arrangement of the spacer elements 81, 82, one of which is indicated in dotted lines, it being observed that there is a free radial oil passage through the assembly notwithstanding this overlapping. A similar precaution is made in the case of the modification of Figs. 1 to 3, as mentioned above.

In Figs. 6 and 7, I illustrate a further modified embodiment of my invention, Fig. 7 including an assembly made up of cylinder wall engaging elements 6, 6, 5, 5 with a spacer assembly of the type illustrated in Figs. 4 and 5, although it will be apparent that a spacer assembly such as is shown in Figs. 1, 2, and 3 may be employed. In this embodiment, instead of employing a plurality of annular expander members or springs such as those designated 10, 11 in Fig. 1, I employ an integral annular split spring steel member 18.

This expanding member or spring 18 is illustrated in detail in Fig. 6, the pairs of cylinder wall engaging elements or segments 5, 5, 6, 6 with which it coacts being illustrated in dotted lines. It will be observed that the upper and lower sides of the spring element 18 are punched or struck out to provide circumferentially and axially spaced and staggered pairs of leaf spring or tongue-like spring elements or fingers 19 each of which is of less axial width than the remainder of the ring and is curved and indented inwardly somewhat as illustrated in Fig. 7 to engage the inner annular edge of the wall engaging elements or segments 5. Between each successive pair of the leaf spring elements on the respective upper or lower sides of the expander member 18, the latter is left of full width to provide the further spring elements 20 which are engageable with the pair of outermost cylinder wall engaging elements 6 exerting a resilient radial action thereon which is quite independent of that exerted on the innermost pair 5. There is a spring element 20 engaging a sealing element 6 in angular register with each pair of spring fingers 19 engaging a sealing element 5. Thus, the radial thrust on elements 5, 6 is uniformly distributed around the circumference thereof.

Although Figs. 6 and 7 illustrate the outer cylinder wall engaging elements 6 as having a greater radial thickness than the inner elements 5, such provision is not essential and if desired the two pairs may have the same radial thickness since the independently acting inner spring elements or fingers 19 of the spring 18 will still exert independent thrust on the elements 5.

The foregoing piston ring assembly is mainly characterized by its simplicity and the inexpensiveness thereof, all of its elements being made up of thin ribbon-like material and easily and quickly produced by the well known coiling method of making piston rings. Although the cylinder wall engaging elements or segments 5, 6 and the inner expanding spring members 10, 11, and 18 are preferably of a good grade of spring steel, the material of which the spacer elements are made is capable of considerable variation and it may be formed of steel, cast iron, brass, zinc, and the like.

I have illlustrated the spacer assembly as being out of contact with both the cylinder wall 4 and the bottom 21 of the piston ring groove 2. I find this is quite satisfactory, although if desired it would, of course, be possible to center the spacer assembly by contact with either the cylinder or the expander. I preferably make provision in the process of forming the spacer elements for preventing a uniform engagement of the inner spacing element 9 with all of the crimps or rounded angles of the radial expanding springs, that is, the sections or elements 8, 9 thereof and particularly the latter, which is the innermost element, are coiled and accurately cut to length with the extremities or ends 15, 17 thereof engaging and thereby regulating the diameter of the elements. This prevents the spacer elements from contracting substantially so as to have a large area of contact with the expanding spring and eliminates danger of excessive wear on the crimps or angles of the latter. Another expedient which suggests itself is the provision of inwardly projecting indentations on the inner spacer element 9 or 82 positioned so as to engage the expanding spring between the crimps or angles thereof and in a plurality of places about the circumference thereof. In each of these constructions, there is a certain amount of floating of the spacer relative to the ring assembly, but little likelihood of destructive wear on the expander. Of course, if desired the outer spacer element could also be formed with a cylinder wall engaging flange to center the spacer, as illustrated in my Patent No. 2,148,997, wherein a cast iron integral spacer is shown.

The number of spacer elements making up the spacer asssembly may vary in accordance with the deepness of the groove receiving the piston ring assembly 1. Thus, in a very deep groove, for example, it might be desirable to use as many as three of the expander elements set edgewise into the groove between the steel cylinder wall contacting sections.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a piston ring assembly of the type described, a pair of thin cylinder wall engaging elements arranged in side-by-side contact and disposed with the edge thereof for engagement with a cylinder wall, and means for radially expanding said wall engaging elements independently of one another comprising an integral one-piece expanding spring having portions thereof partially cut away from the spring and reduced in width to provide independent expanding spring fingers each engageable individually with the inner annular side of one of said cylinder wall engaging elements, the portions of the spring of greater width axially overlapping and engaging the other element to expand the same independently of the element engaged by said fingers, said expanding spring having recesses therein providing for drainage of oil through said piston ring assembly.

2. In a piston ring assembly of the type described, a pair of thin cylinder wall engaging elements arranged in side-by-side contact and disposed with the edge thereof for sliding engagement with a cylinder wall, and means for independently expanding said wall engaging elements comprising an integral one-piece expanding spring having portions thereof reduced in width and partially cut away from the spring to provide independent expanding spring fingers engageable individually with the inner annular side of one of said cylinder wall engaging elements, the portions of the spring of greater width axially overlapping and engaging the other element to expand the same independently of the element engaged by said fingers said expanding spring having recesses therein providing for drainage of oil through said piston ring assembly.

3. In a piston ring assembly of the type described, a pair of thin cylinder wall engaging elements arranged in side-by-side contact and disposed with the edge thereof for sliding engagement with a cylinder wall, and means for independently expanding said wall engaging elements comprising an integral one-piece expanding spring having portions thereof reduced in width and partially cut away from the spring to provide independent expanding spring fingers engageable individually with the inner annular side of one of said cylinder wall engaging elements, the portions of the spring of greater width axially overlapping and engaging the other element to expand the same independently of the element engaged by said fingers.

4. A piston ring assembly comprising spaced pairs of thin flat side members, the side members of the pairs being arranged in side by side relation, an intermediate spacer member disposed between the inner side members of the pairs, the outer members of the pairs being of substantially greater axial width than the inner members of the pairs, an expander acting upon the outer side members of the pairs, and a second expander disposed between the outer side members of the pairs and acting upon the inner side members of the pairs.

5. A piston ring assembly comprising spaced pairs of thin flat side members, the side members of the pairs being arranged in side by side relation, an intermediate spacer member disposed between the inner side members of the pairs, the outer members of the pairs being of substantially greater axial width than the inner members of the pairs, and expander means independently acting upon the side members of the pairs.

6. A piston ring assembly comprising spaced groups of thin flat side members, the members of the group being arranged in side by side relation, an intermediate spacer member disposed between the groups of said members, the outer members of the group being of substantially greater axial width than the other members of the groups, an expander means acting upon the outer members of the groups, and an expander means disposed between the outer side members of the groups and acting upon the inner members of the groups.

7. A piston ring assembly comprising spaced groups of thin flat side members, the members of the group being arranged in side by side relation, an intermediate spacer member disposed between the groups of said members, the outer members of the group being of substantially greater axial width than the other members of the groups, and expander means independently acting upon certain of the side members of the groups.

8. In a piston ring assembly of the type described, pairs of annular cylinder wall engaging elements, the elements of each pair being in side by side contact and of different diameter and the larger elements of the pairs being arranged in the axially outermost position, spacing means disposed between said pairs for maintaining said pairs in axially spaced arrangement, and means disposed behind said spacing means for radially expanding said cylinder wall engaging element, comprising means acting expansively on the axially outermost element of each pair, and further means extending between said outermost relatively large elements to engage and independently expand the innermost elements.

9. In a piston ring assembly of the type described, a plurality of annular cylinder wall engaging elements, spacing means for maintaining certain of said elements in axially spaced arrangement, there being a pair of said wall engaging elements of different diameter arranged in side-by-side contact on one axial side of the spacing means and a further wall engaging element on the other axial side of the spacing means, and means for radially expanding said wall engaging elements, comprising means acting on the element of said pair axially remote from the spacing means, and means engaging and expanding said adjacent spaced elements independently of said remote element.

10. In a piston ring assembly, a plurality of annular split wall engaging elements including pair of elements of different diameters in side-by-side engagement, and a further element in axially spaced relation to the pair, means for maintaining said axially spaced relation, the larger element of said pair being disposed axially remote from said further element, and means for radially expanding said elements including means expandingly engaging said larger and further elements, and means radially overlapping said larger element to engage the smaller element of said pair and expand the same independently of the remote and further elements.

11. In a piston ring assembly of the type described, a plurality of annular cylinder wall engaging elements, there being a pair of said wall engaging elements of different diameter arranged in side-by-side contact and a further wall engaging element in substantial axially spaced relation to said pair, and means for radially expanding said wall engaging elements, comprising means acting expansively on one element of said pair, and means engaging and expanding said further element and the other element of the pair independently of said one element.

12. In a piston ring assembly, a plurality of annular split wall engaging elements including at least one pair of elements of different diameters in side-by-side engagement, and a further element in axially spaced relation to the pair, the larger element of said pair being disposed axially remote from said further element, and means for radially expanding said elements including means expandingly engaging said larger and further elements, and means radially overlapping said larger element to engage the smaller element of said pair and expand the same independently of the remote and further elements.

HAROLD P. PHILLIPS.